United States Patent [19]

Smith

[11] Patent Number: 4,578,631
[45] Date of Patent: Mar. 25, 1986

[54] HIGH-SPEED FEEDBACK CIRCUIT

[76] Inventor: Steve Smith, 5100 Channel Ave., Richmond, Calif. 94804

[21] Appl. No.: 571,740

[22] Filed: Jan. 18, 1984

[51] Int. Cl.⁴ .......................................... H02M 1/15
[52] U.S. Cl. .................................. 323/282; 323/285
[58] Field of Search ............... 323/283, 285, 286, 287, 323/282, 284, 351

[56] References Cited

U.S. PATENT DOCUMENTS

| | | | |
|---|---|---|---|
| 3,303,405 | 2/1967 | Schwarz | 363/28 |
| 3,311,808 | 3/1967 | Schwarz | 363/97 |
| 3,659,184 | 4/1972 | Schwarz | 363/41 |
| 4,348,598 | 9/1982 | Smith | 323/290 |

OTHER PUBLICATIONS

Schwarz, "Power Processing", NASA SP-244, 1971.

Primary Examiner—Peter S. Wong
Assistant Examiner—D. L. Rebsch
Attorney, Agent, or Firm—Thomas E. Schatzel

[57] ABSTRACT

A high-speed feedback circuit for use with, particularly, a buck or buck derived regulator (power processor). The circuit employs a voltage developed by the regulator after the switch and before the filter. From the voltage a current is developed which is combined with (subtracted from) a reference current. The combined current is integrated in a capacitor to develop a voltage used to drive the switch.

15 Claims, 1 Drawing Figure

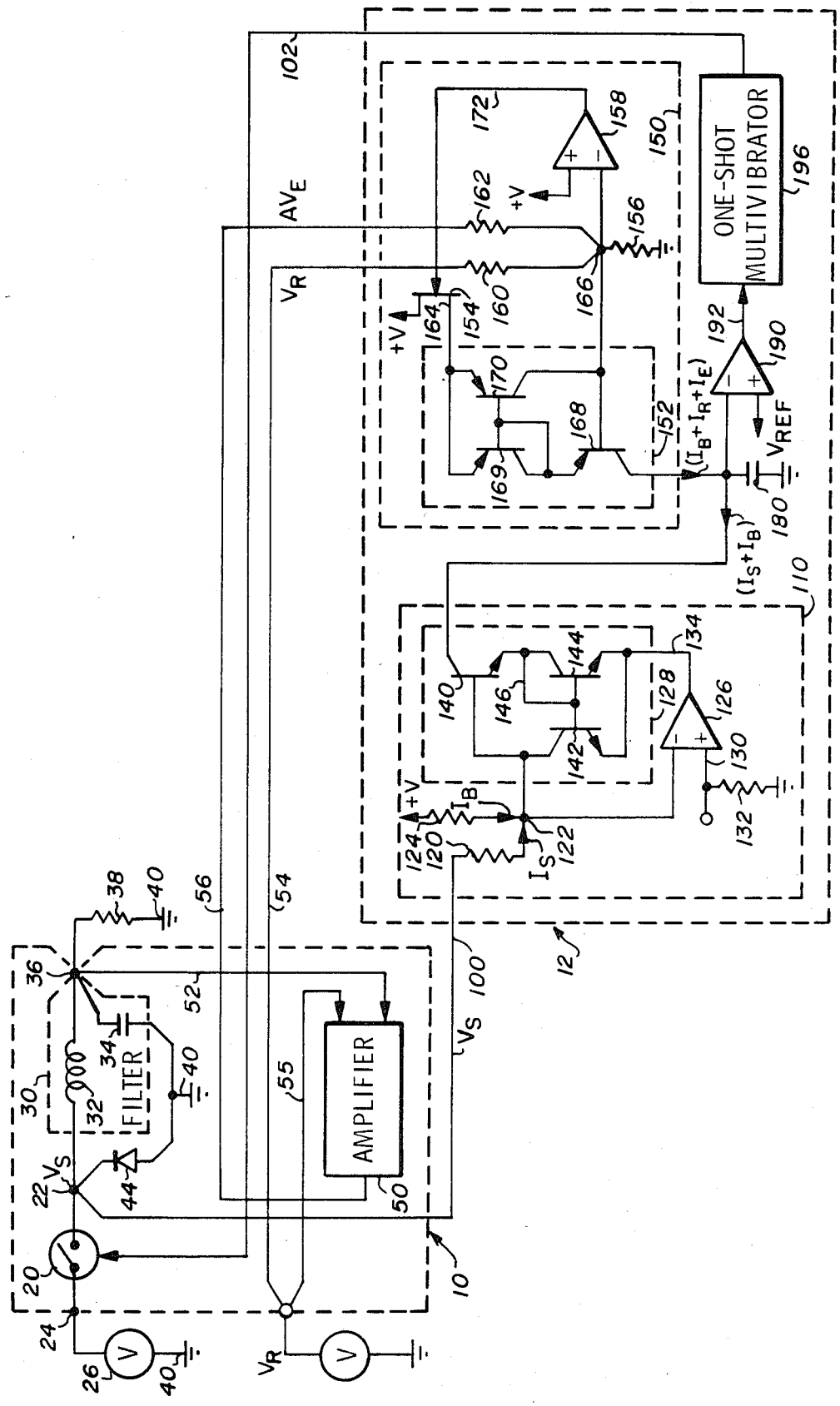

HIGH-SPEED FEEDBACK CIRCUIT

BACKGROUND OF THE INVENTION

1. Field of the Invention

The present invention relates to regulators (power processors) generally and more specifically to a feedback circuit having improved high-speed characteristics, a circuit particularly useful with a buck or a buck-derived regulator.

2. Description of the Prior Art

The feedback employed in many regulators is less than ideal. Consider, for example, a basic prior-art-type buck regulator (power processor). Such a regulator includes a transistor functioning as a switch connected between a regulator-internal node and an input terminal, the terminal for connection to receive a regulator-driving voltage. The switch is driven so as to periodically couple the input-terminal regulator-driving voltage to the internal node to develop at the node switched voltage which varies as a train of pulses. Also included is a filter having an inductor and capacitor. The inductor is connected between the internal node and an output terminal, the terminal for connection to a load. The capacitor is connected between the output terminal and a voltage-common (circuit ground) terminal. The filter averages the internal-node switched voltage to develop at the output terminal a voltage suitable for driving the load. To provide a path for inductor current when the switch is not coupling the input-terminal regulator-driving voltage to the internal node, a diode is included connected between the internal node and the common terminal.

Finally, the regulator includes an amplifier and an analog-to-discrete-interval (A/DI) converter, the combination connected to form a feedback path from the regulator-output terminal to the switch. The amplifier compares (at least) a scaled portion of the output-terminal load-driving voltage to (at least) a scaled portion of an (internally or externally generated) reference (control) voltage and amplifies the difference voltage to develop an amplified error voltage the level of which represents (in amplified form) the deviation from the ideal (error) of the level of the output-terminal load-driving voltage. The analog-to-discrete-interval converter drives the switch. Responsive to the level of the amplified error voltage, the analog-to-discrete-interval converter alters, as appropriate, the switch drive to adjust the internal-node-switched-voltage pulse-train duty factor (the pulse width (duration) and/or the pulse repetition rate) so as to correct the output-terminal-load-driving-voltage-level.

The output-terminal load-driving voltage is less than ideal for feedback purposes. This is because the output-terminal load-driving voltage reflects the delay associated with the filter, a delay which constrains the feedback-loop bandwidth limiting the rate at which the feedback loop can respond to changes in, for example, the level of the input-terminal regulator-driving voltage.

To further exemplify the problem, consider that to reduce the voltage level of the switching ripple and noise (as a component of the output-terminal load-driving voltage with respect to its level as a component of the internal node switched voltage) by more than a factor of 100 requires that the filter have a filter frequency of less than one tenth the switching-ripple frequency (pulse-train rate). Also, loop stability requires that the feedback-loop gain be reduced to unity at a frequency less than approximately one half the filter frequency, unless compensation is provided for (one or both of the two poles of) the filter. Thus, a buck regulator having a 48 Khz nominal pulse train rate, a 4.8 Khz filter frequency and a feedback loop the gain of which is reduced to unity at a frequency of 2400 Hz, would provide little reduction in the level of the 2400 Hz ripple component of an input-terminal regulator-driving voltage developed by full-wave rectifying power obtained from a three-phase 400 Hz main.

Of course, a higher feedback-loop unity-gain frequency may be employed if compensation is provided for the filter. Unfortunately, the component value stability, particularly that of the capacitor, limits the usefulness of this technique. Additionally, some improvement has been achieved by feeding internal-node information (forward) around the filter to the comparator such as by means of another inductor winding for sampling the inductor voltage drop.

Recognizing these limitations (in a 1971 National Aeronautics and Space Administration publication entitled "Power Processing" and designated NASA SP-244) Franscisc C. Schwarz suggested employing for feedback purposes the internal-node switched voltage. In addition to employing the internal-node voltage in a new (Type 1) feedback loop, Schwarz suggested retaining in modified form the old (Type 0) feedback loop as an outer, secondary, loop to correct for residual, low-frequency, errors. For the outer, secondary, feedback loop, Schwarz suggested developing the amplified error voltage in a fashion similar to that previously described; however, Schwarz suggested using substantially less gain as the outer loop need only correct for the regulation loss associated with the filter and other downstream transformation elements, such as, a DC-AC inverter, etc.

From the amplified error voltage, Schwarz suggested subtracting the scaled reference voltage and adding a scaled portion of the internal-node switch voltage to develop a voltage which Schwarz suggested integrating. Finally, Schwarz suggested sensing when the level of the integrated voltage reaches a predetermined level to develop a signal for triggering a monostable (one-shot) multi-vibrator which is employed to drive the switch.

Although the Schwarz technique would suggest that full loop gain could be used to substantially the switching frequency (pulse-train rate), practical implementations substantially limit the achievable performance. Specifically, voltage changes must charge stray circuit capacitances which limit the maximum rate of change, imposing delays in the feedback loop. (The delays are undesirable because the maximum available gain of a Type 1 feedback loop is an inverse function of the signal delay within the loop.)

Schwarz discloses an implementation of the previously described technique in the U.S. Pat. No. 3,659,184. The reader may also find of interest the U.S. Pat. Nos. 3,303,405 and 3,311,808, also of Franscisc C. Schwarz.

SUMMARY OF THE PRESENT INVENTION

It is therefore an object of the present invention to provide a regulator feedback circuit which is high speed.

Another object of the present invention is to provide a regulator feedback circuit which is simple.

Briefly, for use with a buck regulator, the preferred embodiment of the present invention includes a circuit for developing a current the instantaneous level of which is equal to a constant times the instantaneous level of the regulator-developed internal-node switched voltage plus a constant level, bias current and a circuit for developing another current, the level of which is equal to the bias current plus a constant times the level of a reference voltage plus a constant times the level of the regulator-developed amplified error voltage. Also included is a capacitor for developing a voltage the level of which is equal to the integral of the level of (the difference) of the two currents and a comparator for ascertaining each time the capacitor voltage reaches a predetermined level and for driving the switch so that the switch couples the regulator input-terminal regulator-driving voltage to the regulator internal node for a predetermined period thereafter.

The ability to provide a regulator feedback circuit, the performance of which is relatively independent of stray circuit capacitances, is a material advantage of the present invention.

Another advantage of the present invention is the ability it affords to provide a feedback circuit which is amenable to fabrication on a single semiconducting substrate (i.e., integration).

These and other objects and advatages of the present invention will no doubt be obvious to those skilled in the art after having read the following detailed description of the preferred embodiment which is illustrated in the FIGURE of the drawing.

IN THE DRAWING

FIG. 1 is a circuit diagram of the presently preferred embodiment in accordance with the present invention of a high-speed feedback circuit and a modified buck regulator.

DETAILED DESCRIPTION OF THE PREFERRED EMBODIMENT

Illustrated in FIG. 1 of the drawing is the presently preferred embodiment in accordance with the present invention of a high-speed feedback circuit suitable for use in controlling a regulator, such as, for example, the modified buck regulator generally designated by the number 10, the feedback circuit being generally designated by the number 12. For use with feedback circuit 12, regulator 10 is shown to include a switch 20 connected between a regulator-internal node 22 and an input terminal 24, the terminal for connection to receive a regulator driving-voltage, represented by a voltage source 26. As will become apparent shortly, switch 20 is driven so as to periodically couple the terminal 24 regulator-driving voltage to node 22 to develop at the node a switched voltage ($V_S$) which varies as a train of pulses. Regulator 10 also includes a filter 30 having an inductor 32 and a capacitor 34. Inductor 32 is connected between node 22 and an output terminal 36, the terminal for connection to a load, represented by a resistor 38. Capacitor 34 is connected between terminal 36 and a voltage common (circuit ground) terminal 40. Filter 30 averages the node 22 switched voltage to develop at terminal 36 a voltage suitable for driving the load, resistor 38. To provide a path for inductor 32 current when switch 20 is not coupling the terminal 24, regulator-driving voltage to node 22, a diode 44 is included connected between node 22 and terminal 40.

Finally, regulator 10 includes an amplifier 50 which is connected to terminal 36 by a line 52, connected to a terminal by a line 55 to receive an (internally or externally generated) or reference (control) voltage ($V_R$) developed thereon and connected to a line 56. Amplifier 50 compares (at least) a scaled portion of the terminal 36, load-driving voltage to (at least) a scaled portion of the line 55 reference voltage and amplifies the difference voltage to develop on line 56 an amplififed error voltage ($AV_e$) the level of which represents (in amplified form) the deviation from the ideal (error) of the terminal 36, load-driving voltage. For use with feedback circuit 12, a substantially lower amplifier 50 voltage gain is required, as will become apparent shortly. Additionally, for use with feedback circuit 12, regulator 10 does not require (include) an analog-to-discrete-internal (A/DI) converter, as this function is performed by circuit 12.

For controlling regulator 10, high-speed feedback circuit 12, in addition to being connected to voltage common terminal 40 (circuit ground), is connected to node 22 by a line 100 and to switch 20 by line 102. In the preferred embodiment, circuit 12 is also connected to lines 54 and 56. Circuit 12 drives switch 20. Responsive to the instantaneous level of the node 22 switched voltage ($V_S$) during each node 22 switch voltage-pulse-train period, circuit 12 is operative to alter as appropriate, the switch 20 drive to adjust the node 22, switched-voltage pulse-train duty factor so as to stabilize the average node 22 switched-voltage level. Additionally, circuit 12 is responsive to the level of the control or reference (control) voltage developed on line 54, when so connected, and operative to alter the switch 20 drive so that the average node 22, switched-voltage level tracks the level of the reference (control) voltage. Further, circuit 12 is responsive to the level of the amplified-error voltage developed on line 56, when so connected, and operative to alter the switch 20 drive so as to correct the terminal 36, load-driving voltage level for feedback circuit and filter induced errors.

For this purpose, circuit 12 includes a circuit 110 for developing (sinking from line 112) a current ($I_S+I_B$) the instantaneous level of which is equal to a constant times the instantaneous level of the switched voltage developed on line 100 (node 22) ($V_S$) plus another constant. Preferably, circuit 110 has a resistor 120 connected between line 100 and a node 122, another resistor 124 connected between a stable-power-supply-voltage source (+V) and node 122, an operational amplifier 126, and a current mirror 128. The non-inverting input of amplifier 126 is connected to a line 130 which is coupled to voltage common terminal 40 (circuit ground) by a biasing resistor 132. Node 122 is connected to the inverting input of amplifier 126 the output of which is connected to a line 134.

Current mirror 128 is configured around three NPN transistors, respectively designated 140, 142 and 144. Line 134 is connected to the emitters of transistors 142 and 144; and, a line 146 is connected both to their bases and to the collector of transistor 144. The collector of transistor 142 is connected to node 122 and to the base of transistor 140, the collector of which is connected to node 112. Although it is preferable that transistors 142 and 144 be matched devices located in close proximity on a common chip, mismatches in the transistors merely cause low frequency errors which are compensated for by the outer loop.

The operation of circuit 100 is believed to be as follows. Operational amplifier 126 develops a voltage on line 134 so as to maintain the voltage developed on line 122 at circuit ground level. Current mirror 128 sinks a current flow into the mirror from node 112, the instantaneous level of which is equal to the instantaneous level of the current flowing into the mirror from node 122. Since the current flow into the inverting input of operational amplifier 126 is neglibible (or, at least, unimportant, since compensation for low frequency errors is provided by the outer loop), the instantaneous level of the current flowing into the mirror from node 122 is equal to the instantaneous level of the voltage developed on line 100 (node 22) ($V_S$) times the admittance (one over the resistance) of resistor 120 (a constant) plus the level of the resistor 124 voltage times the admittance of resistor 124 (both constants).

It is important to note that the instantaneous level of the voltage developed on line 100 (node 22) goes negative when switch 20 is not coupling the terminal 124, regulator-driving voltage to node 22 and diode 44 is conducting. To prevent the current flowing from node 122 into current mirror 128 from going negative and to best utilize the characteristics of the transistors, resistor 124 is used to develop the constant level current ($I_B$) for biasing the current mirror.

Additionally, high-speed feedback circuit 12 includes a circuit 150 for developing (sourcing into node 112) a current ($I_B+I_R+I_E$) the level of which is equal to the level of the bias current flowing into circuit 110 from node 112 ($I_B$) plus (a reference current) a constant times the level of the reference voltage developed on line 54 ($V_R$) plus a constant times the level of the amplified error voltage developed on line 56 ($AV_e$). Preferably, circuit 150 has another current mirror 152, an N-channel junction-type field-effect transistor (JFET) 154, a resistor 156, and another operational amplifier 158. Further, circuit 150 is shown to have a pair of resistors designated 160 and 162.

Current mirror 152 is connected to node 112, a line 164 and a node 166. The principal difference between current mirror 128 and mirror 152 is that the latter is configured around three PNP transistors respectively designated 168-170. Transistor 154 is configured with its drain connected to a power-supply-voltage source, its gate connected to a line 172 and its source connected to line 164. Resistor 156 is connected between line 164 and voltage common terminal 40 (circuit ground). Resistor 160 is shown connected between line 54 and node 166; and, resistor 162 is shown connected between line 56 and node 166. Operational amplifier 158 is configured with its non-inverting input connected to the resistor 124 stable-voltage source, its inverting input connected to node 166 and its output connected to line 172.

The operation of circuit 150 is believed to be as follows. Operational amplifier 158 develops a voltage on line 172 so as to maintain the level of the voltage developed on node 166 at the non-inverting-input stable-voltage level. Transistor 154 provides a voltage offset between lines 172 and 164 of approximately the transistor pinch-off voltage to reduce the maximum line 172 voltage level which amplifier 158 would otherwise be required to develop. Current mirror 152 sources a current into node 112, the level of which is equal to the current drawn from the mirror into node 166. Since the current flow into the inverting input of operational amplifier 158 is negligible (or, at least, unimportant, since compensation for low frequency errors is provided for by the outer loop), the current flowing from the mirror into node 166 is equal to the admittance of resistor 156 minus the admittance of resistor 160 and minus the admittance of resistor 162, the quantity times the non-inverting-input stable-voltage level (all constants) plus the level of the reference voltage developed on line 54 ($V_R$) times the admittance of resistor 160 (a constant) plus the level of the amplified error voltage developed on line 56 ($AV_e$) times the admittance of resistor 162 (again a constant).

For clarity, voltage-to-current conversion is illustrated as being accomplished by means of resistors, such as resistors 160 and 162. It is preferable that such conversion be accomplished so as to present to the circuit a relatively high impedance. In the preferred embodiment, each such conversion is accomplished by means of a respective transistor configured with the transistor emitter (source) coupled by a resistor to the error-voltage source (such as line 54 or 56), the transistor base (gate) coupled to a stable-voltage source, and the transistor collector (drain) connected to the current summing point (such as node 166). The transistor base (gate) may be directly connected to the stable-voltage source or coupled thereto by means of an operational amplifier configured with the amplifier output connected to the transistor base (gate), the amplifier inverting input connected to the transistor emitter (source) and the amplifier non-inverting input connected to the stable-voltage source.

In another embodiment used when a constant level reference voltage is developed on line 54, current mirror 152, transistor 154, resistors 156, 160 and 162, and operational amplifier 158 are replaced by a constant current source. One embodiment of the current source has a transistor the emitter of which is coupled to node 112, by a biasing resistor, the collector of which is connected to a positive-power-supply voltage, and the base of which is coupled by a zener diode to node 112 and by a biasing resistor to the power-supply voltage source. Additionally, line 56 is coupled to line 130 by a voltage divider resistor. The current source sources a current into node 112, the level of which is equal to the level of the bias current ($I_B$) plus the level of the reference current ($I_R$)(previously established by the line 54 reference voltage level and the resistor 162 admittance).

It should be noted that the level of the bias current ($I_B$) flowing into circuit 110 from node 112 is balanced by that flowing out of circuit 150 into node 112.

Further, high-speed feedback circuit 12 includes a circuit for developing at node 112 a voltage, the level of which is equal to the integral of the level of the current flowing into circuit 110 from node 112 plus the level of the current flowing from circuit 150 into node 112. Preferably, for this purpose, a capacitor 180 is connected between node 112 and voltage common terminal 40 (circuit ground).

It should be apparent that during the time when switch 20 is not coupling the terminal 24, regulator-driving voltage to node 22, the voltage level developed at node 112 will fall, and during the rest of each of the periods, the node 112 voltage level will rise.

Finally, high-speed feedback circuit 12 includes a comparator 190 having one input connected to the resistor 124 stable-voltage source, another input connected to node 112 and an output connected to a line 192. Comparator 190 devlopes on line 192 a voltage the level of which designates each of the times at which the node 112 voltage level reaches the comparator stable-voltage level.

For clarity, a monostable (one-shot) multi-vibrator 196 is shown connected between line 192 and switch 20. In one embodiment multi-vibrator 196 develops on line 102 a voltage which varies as a series of pulses, each of predetermined width, each following a respective one of the times designated by the node 112 voltage level, each pulse for changing the state of switch 20 for the duration of the pulse. Depending upon the pulse polarity, switch 20 couples the terminal 24 regulator-driving voltage to node 22 for the duration of each pulse (constant on time) or couples the voltage to the node except during the duration of each pulse (constant off time). (Alternatively, constant pulse rate may be used with some circuit modifications.)

In the preferred embodiment, a switch is used, for switch 20, of the type which is disclosed in my U.S. Pat. No. 4,348,598, the switch performing the function represented by monostable multi-vibrator 196.

For clarity, high-speed feedback circuit 12 is shown herein with a modified regulator of the buck type, designated 12. It should be obvious, however, that circuit 12 is useful for controlling other regulators, particularly, those in which filtering is employed after switching (buck derived regulators). Obviously, other elements, such as, for example, transformer windings for voltage conditioning may be employed following the switching and before the filtering.

After having read the preceding disclosure, certain alterations and modifications of the present invention will no doubt be obvious to those skilled in the art. It is therefore intended that the following claims be interpreted to cover all such alterations and modifications as fall within the true spirit and scope of the invention.

What is claimed is:

1. A circuit for use with a capacitor and a regulator, the regulator being of the type which includes a switch for developing a switched voltage the level of which varies as a train of pulses, the circuit for stabilizing the average level of the switched voltage at a level designated by the level of a reference voltage, the circuit comprising in combination:

first current developing means for connection to receive the switched voltage, said first current developing means for developing a first current at least a portion of the instantaneous level of which is equal to a predetermined constant times the instantaneous level of said switched voltage;

second current developing means for developing a second current at least a portion of the level of which is equal to a predetermined constant times the reference voltage level, said first and said second current developing means for connection to the capacitor so that said capacitor develops a voltage the magnitude of the level of which is equal to the integral of the level of a current the level of which is equal to the difference between said first and said second currents;

comparator means for connection to said capacitor, said comparator means for developing a voltage the level of which designates when the level of said capacitor developed voltage is at a predetermined voltage level; and switch driving means for connection to the switch and connected to said comparator means, said switch driving means being responsive to said comparator means developed voltage and operative to drive said switch so as to stabilize the average level of said switched voltage at the level designated by the level of said reference voltage.

2. A circuit as recited in claim 1 wherein said first current developing means develops said first current so that another portion thereof is equal to a predetermined constant bias level and wherein said second current developing means develops said second current so that another portion thereof is equal to said bias level.

3. A circuit as recited in claim 2 wherein said first current developing means includes:

a node, a resistor having a first end connected to said node and another end for connection to receive said switched voltage, another resistor connected between a predetermined level voltage and said node, an operational amplifier having an input connected to said node, another input coupled to a predetermined level voltage and an output, and a current mirror having a current level controlling terminal connected to said node, a voltage terminal connected to said operational amplifier output and a controlled level current terminal for connection to said capacitor.

4. A circuit as recited in claim 3 wherein said current mirror has:

a first transistor employing an emitter connected to said operational amplifier output, a base, and a collector connected to said node;

a second transistor employing an emitter connected to said operational amplifier output, a base connected to said first transistor base and a collector connected to said first transistor base; and a third transistor having an emitter connected to said first transistor base, a base connected to said node, and a collector for connection to said capacitor.

5. A circuit as recited in claim 4 wherein said switch driving means so drives said switch that each of said train of pulses has a predetermined width.

6. A circuit for use with a regulator of the type which includes a switch for developing a switched voltage the level of which varies as a train of pulses, the circuit for stabilizing the average level of the switched voltage at a level designated by the level of a reference voltage, the circuit comprising in combination:

first current developing means for connection to receive the switched voltage, said first current developing means for developing a first current at least a portion of the instantaneous level of which is equal to a predetermined constant times the instantaneous level of said switched voltage;

second current developing means for developing a second current at least a portion of the level of which is equal to a predetermined constant times the reference voltage level;

capacitor means connected to said first and said second current developing means, said capacitor means for developing a voltage the magnitude of the level of which is equal to the integral of the level of a current the level of which is equal to the difference between said first and said second currents;

comparator means connected to said capacitor means, said comparator means for developing a voltage the level of which designates when the level of said capacitor developed voltage is at a predetermined voltage level; and switch driving means for connection to the switch and said comparator means, said switch driving means being responsive to said comparator means developed voltage and operative to drive said switch so as to stabilize the average level of said switched voltage at the level designated by the level of said reference voltage.

7. A circuit as recited in claim 6 wherein said first current developing means develops said first current so that another portion thereof is equal to a predetermined constant bias level and wherein said second current developing means develops said second current so that another portion thereof is equal to said bias level.

8. A circuit as recited in claim 7 wherein said first current developing means includes:
   a node,
   a resistor having a first end connected to said node and another end for connection to receive said switched voltage,
   another resistor connected between a predetermined level voltage and said node,
   an operational amplifier having an input connected to said node, another input coupled to a predetermined level voltage and an output, and
   a current mirror having a current level controlling terminal connected to said node, a voltage terminal connected to said operational amplifier output and a controlled level current terminal connected to said capacitor.

9. A circuit as recited in claim 8 wherein said current mirror has:
   a first transistor employing an emitter connected to said operational amplifier output, a base, and a collector connected to said node;
   a second transistor employing an emitter connected to said operational amplifier output, a base connected to said first transistor base and a collector connected to said first transistor base; and
   a third transistor having an emitter connected to said first transistor base, a base connected to said node, and a collector connected to said capacitor.

10. A circuit as recited in claim 9 wherein the regulator further includes a filter for averaging the switched voltage to develop an load-driving voltage, wherein said regulator includes means for developing an amplified error voltage the level of which represents the deviation from a predetermined ideal of the level of said load-driving voltage, wherein said second current developing means includes means for connection to said regulator to receive said amplified error voltage, and wherein said second current developing means develops said second current so that another portion thereof is equal to a predetermined constant times said amplified error voltage.

11. A regulator for developing from a regulator driving voltage a load driving voltage having a level designated by the level of a reference voltage, the regulator comprising in combination:
   a voltage common terminal;
   an input terminal with said common terminal for connection to the regulator driving voltage;
   an output terminal with said common terminal for connection to the load;
   a node;
   a switch connected between said input terminal and said node, said switch for selectively coupling said input voltage to said node to develop at said node a switched voltage which varies as a train of pulses;
   a filter including an inductor connected between said node and said output terminal and a capacitor connected between said output terminal and said common terminal, said filter for developing the load driving voltage from said switched voltage;
   a diode connected between said node and said common terminal, said diode for providing a path for current flowing in said inductor when said switch is not coupling said input voltage to said node;
   first current developing means connected to said node for developing a first current at least a portion of the instantaneous level of which is equal to a predetermined constant times the instantaneous level of said switched voltage;
   second current developing means for developing a second current at least a portion of the level of which is equal to a predetermined constant times the reference voltage level;
   capacitor means connected to said first and said second current developing means for developing a voltage the magnitude of the level of which is equal to the integral of the level of a current the level of which is equal to the difference between said first and said second currents;
   comparator means connected to said capacitor means, said comparator means for developing a voltage the level of which designates when the level of the capacitor means developed voltage is at a predetermined voltage level; and
   switch driving means connected to said switch and said comparator means, said switch driving means being responsive to said comparator means developed voltage and operative to drive said switch so as to stabilize the average level of said switched voltage at the level designated by the level of said reference voltage.

12. A regulator as recited in claim 11 wherein said first current developing means develops said first current so that another portion thereof is equal to a predetermined constant bias level and wherein said second current developing means develops said second current so that another portion thereof is equal to said bias level.

13. A regulator as recited in claim 12 wherein said first current developing means includes:
   a first resistor having a first end connected to said node and a second end,
   a second resistor connected between a predetermined level voltage and said second end of said first resistor,
   an operational amplifier having an input connected to said second end of said first resistor, another input coupled to a predetermined level voltage and an output, and
   a current mirror having a current level controlling terminal connected to said second end of said first resistor, a voltage terminal connected to said operational amplifier output and a controlled level current terminal connected to said capacitor.

14. A regulator as recited in claim 13 wherein said current mirror has:
   a first transistor employing an emitter connected in said operational amplifier output, a base, and a collector connected to said second end of said first resistor;
   a second transistor employing an emitter connected to said operational amplifier output, a base connected to said first transistor base and a collector connected to said first transistor base; and a third transistor having an emitter connected to said first transistor base, a base connected to said second end of said first transistor, and a collector connected to said capacitor means.

15. A regulator as recited in claim 13 further comprising means for subtracting a scaled portion of said load driving voltage from a scaled portion of the reference voltage level and amplifying the difference voltage to develop an amplified error voltage, wherein said second current developing means is connected to said amplified error voltage developing means, and wherein said second current developing means develops said second current so that another portion thereof is equal to a predetermined constant times said amplified error voltage.

* * * * *